United States Patent [19]

F'Geppert

[11] Patent Number: 4,601,633
[45] Date of Patent: Jul. 22, 1986

[54] HOIST

[75] Inventor: Erwin F'Geppert, Oakland, Mich.

[73] Assignee: The United States of America as represented by the Secretary of the Army, Washington, D.C.

[21] Appl. No.: 679,432

[22] Filed: Dec. 7, 1984

[51] Int. Cl.[4] .............................................. B60P 1/54
[52] U.S. Cl. .................................... 414/546; 212/262; 212/242; 212/258; 212/259; 254/280; 254/284; 414/541
[58] Field of Search ............................... 414/541–543, 414/546, 547, 555; 212/232, 239–242, 255, 256, 258, 259, 262, 263; 254/280, 281, 284, 374

[56] References Cited

U.S. PATENT DOCUMENTS

| | | | |
|---|---|---|---|
| 2,420,072 | 5/1947 | Foote | 254/374 X |
| 2,571,361 | 10/1951 | Harmanson | 414/546 |
| 2,633,999 | 4/1953 | Blackman et al. | 212/262 |
| 2,639,825 | 5/1953 | Eakin | 414/546 |

FOREIGN PATENT DOCUMENTS

| | | | |
|---|---|---|---|
| 51865 | 12/1932 | Norway | 212/262 |
| 997993 | 7/1965 | United Kingdom | 212/262 |

Primary Examiner—Frank E. Werner
Attorney, Agent, or Firm—Peter A. Taucher; John E. McRae; Robert P. Gibson

[57] ABSTRACT

A hoist that includes a winding drum for a load-lift cable mechanism. The drum has two drum sections of slightly different diameter; end portions of the cable are wound in different directions on the drum sections, so that one cable section winds onto a drum section while the other cable section winds off the other drum section. The effect is to provide a very slow net cable motion related to the difference in drum section diameters. The hoist includes a latch mechanism adapted to suspend the load from the boom during certain periods of a load transfer operation.

1 Claim, 5 Drawing Figures

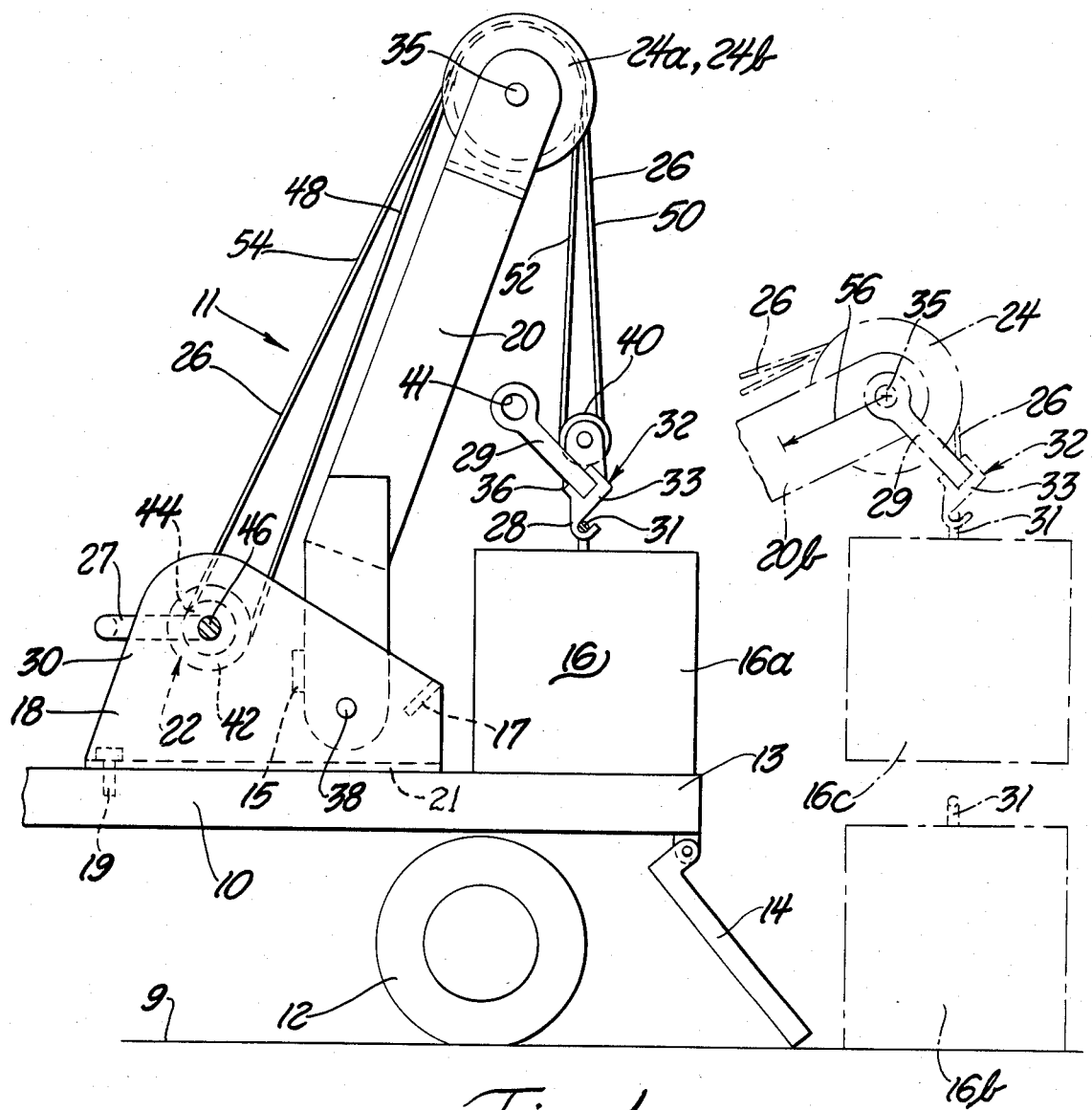
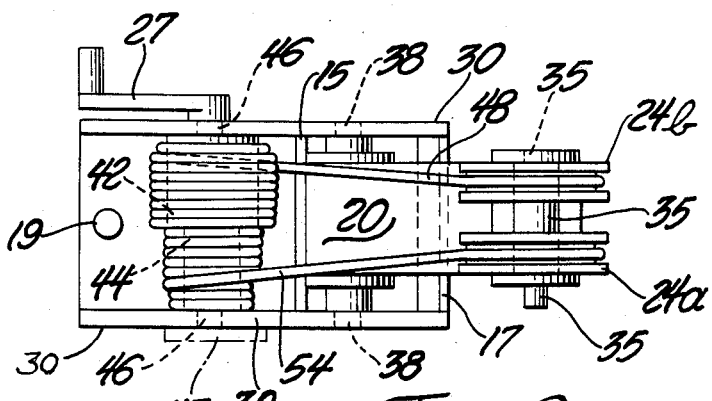
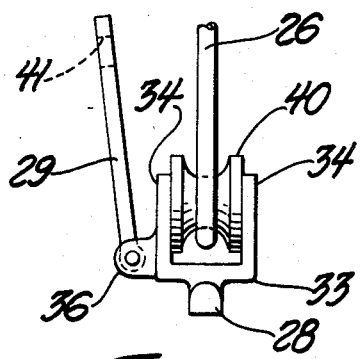
Fig. 1
Fig. 2
Fig. 3

HOIST

GOVERNMENT INTEREST

The invention described herein may be manufactured, used, and licensed by or for the Government for governmental purposes without payment to me of any royalty.

BACKGROUND AND SUMMARY

This invention relates to a low cost hoist especially designed for transferring a load between ground level and a vehicle bed. Contemplated loads are boxes of ammunition, pallets containing food or clothing, etc. The hoist is intended particularly for use on military vehicles designed to move over off-road terrain where permanent hoist equipment is not present or readily available.

Particular objects of the invention are to provide a hoist wherein:

1. The hoist can be easily and quickly attached or mounted to a flat bed truck or trailer.
2. The hoist is manufacturable at relatively low cost.
3. The hoist is operable by a manual cranking motion to lift relatively heavy loads with reasonable human effort.
4. The hoist comprises a swingable boom that can be momentarily latched to the load for moving the load both vertically and laterally, as necessary to transfer the load from ground level up onto the bed of a cargo transport vehicle.
5. The hoist can be used in a reversible manner, i.e., to transfer a load from ground level to the bed of a cargo vehicle or from the bed to ground level.
6. The hoist is capable of being operated by only one technician. There is no requirement for a second technician to manually guide or manipulate the load while it is being lowered or lifted by the hoist.
7. The hoist occupies relatively small space on the vehicle cargo bed.
8. The hoist is relatively light in weight, such that it can be lifted into place on the cargo bed and installed thereon by only one or two technicians.

THE DRAWINGS

FIG. 1 is a side elevational view of a hoist embodying the invention.

FIG. 2 is a top plan view of the FIG. 1 hoist.

FIG. 3 is an end view of a load-suspension mechanism used in the FIG. 1 hoist.

FIG. 1 IN GREATER DETAIL

Figure 4:
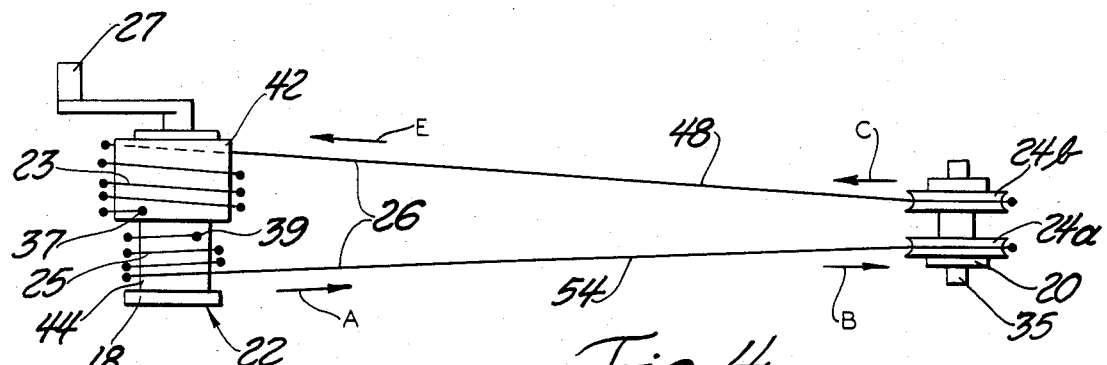
FIGS. 4 and 5 are schematic representations of a cable-pulley arrangement used in the FIG. 1 hoist.

FIG. 1 fragmentarily shows a truck or trailer having a cargo bed 10, rear wheels 12 and tailgate 14. A load 16 (which may be boxed munitions, palletized cargo or a fuel drum) is positioned on the cargo bed between hoist 11 and rear edge 13 of the bed.

Numeral 16a indicates the position of load 16 when resting on cargo bed 10. Numeral 16b indicates the position of load 16 when resting on terrain 19. Numeral 16c indicates the position of load 16 when in an intermediate state during the process of transferring the load between positions 16a and 16b. Hoist 11 is designed to accomplish the load-transfer operation, either from position 16a to position 16b, or from position 16b to position 16a. During the transfer operation, the load is moved laterally, i.e., horizontally; additionally the load is moved vertically.

Load 16 has some type of eye structure at or near its upper end for attachment to the hoist to transmit the load force (weight) to the hoist. FIG. 1 illustrates the eye structure as an inverted U-shaped bail 31. The eye structure could take other forms, e.g., the looped end of a cable, end link of a chain, or an opening in a spreader bar.

Hoist 11 comprises a support frame 18 suitably anchored to bed 10 via a bolt 19. Frame 18 is of channel configuration that includes a horizontal flat web wall 21 resting on bed 10 and two upstanding side walls or flanges 30. The frame is swingably adjustable (repositionable) around bolt 19, as required to reposition the hoist for picking up loads at the rear or side areas of the vehicle.

A boom 20 is swingably mounted or attached to frame 18 via pivot pins 38. Stop bars 15 and 17 extend across frame 18 to limit motion of the boom between an upright position (full lines in FIG. 1) and a prone position projecting laterally beyond an edge of bed 10 (dashed lines 20b in FIG. 1). Two independently rotatable pulleys 24a and 24b are suitably mounted at the outer end of boom 20. As seen in FIG. 2, the pulleys are carried on a shaft or pin 35. Shaft 35 is preferably fixed to the boom 20 walls so that each pulley 24a or 24b can rotate freely on the shaft 35 surface. The shaft-support boom walls may be formed by a channel member welded or otherwise affixed to the upper end of the boom tube.

Load 16 is connectable to the hoist structure via a load-suspension mechanism 32. That mechanism includes a body member 33 that is configured to define a hook 28. Member 33 also includes two upstanding arms 34 (FIG. 3) that support a rotary sheave or pulley 40. A cable 26 extends around the sheave.

Member 33 also includes an ear structure 36 that swingably supports a latch member 29. When the load-suspension means is in near adjacency to pulleys 24a and 24b (as shown in dashed lines in FIG. 1), latch member 29 may be swung manually so that opening 41 in member 29 fits onto the projecting end portion of pin 35. This action provides a temporary attachment of the load-suspension mechanism to boom 20.

CABLE SYSTEM

The hoist is operated by winding or unwinding cable 26 to/from winding drum 22. The drum includes a relatively large diameter section 42 and a relatively small diameter section 44. Suitable pins (shafts) 46 extend from the drum through circular openings in frame walls 30 to support the drum for rotation around the pin axis. A manual crank 27 is suitably attached to one of pins 46.

Figure 5:
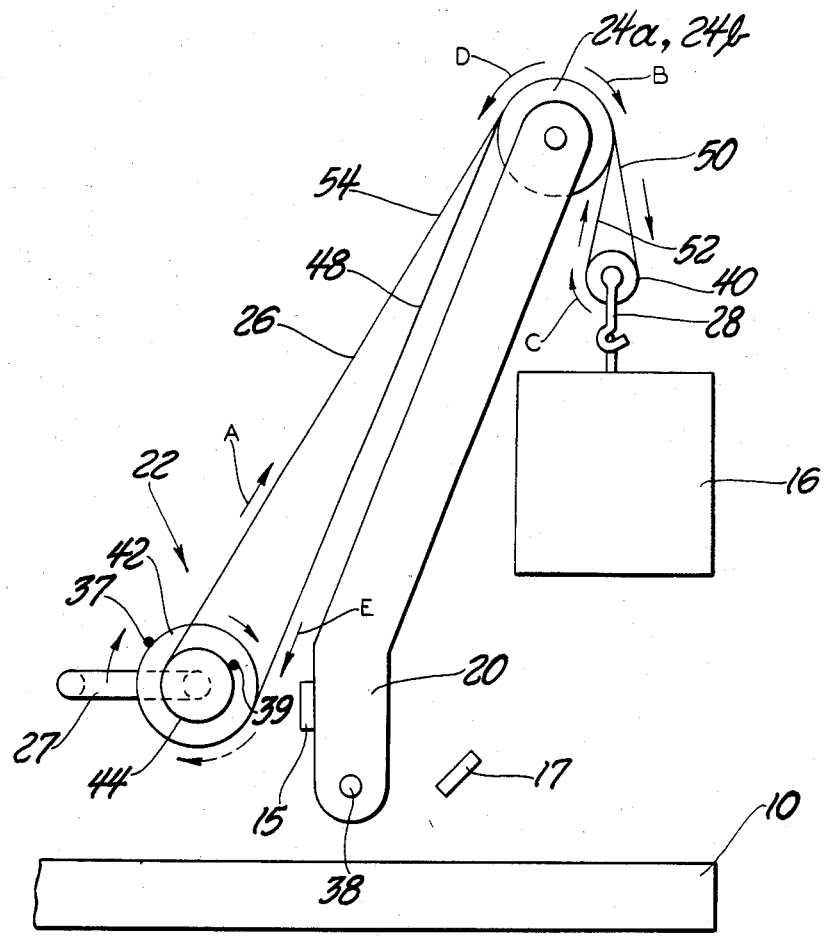

The path taken by cable 26 is best visualized by reference to FIGS. 4 and 5. These figures are diagrammatic depictions of the structures shown in FIGS. 1 through 3, with structural detail removed to emphasize the cable orientation. One end of the cable 26 is anchored to drum section 42, as at 37. The cable is wound around drum section 42 a number of times; then it extends from drum section 42 along pathline 48 onto pulley 24b. The cable extends from pulley 24b downwardly along pathline 50 to sheave 40. The cable runs around sheave 40 to pulley 24a. From pulley 24a the cable extends along pathline 54 to drum section 44. The cable is wound a number of times around drum section 44; the extreme end of the cable is anchored to the drum, as at 39.

The cable is wound in different directions on the different drum sections 42 and 44. For example, as seen in FIG. 4, cable section 48 winds off (or on) an under-surface of drum section 42, whereas cable section 54 winds off (or on) an upper surface of drum section 44.

Manual rotation of crank 27 causes one of cable sections 48 and 54 to wind off the drum; the other cable section winds onto the drum. The net cable motion is related to the difference in diameters of drum sections 42 and 44. For example, if drum section 42 has a diameter of eight inches and drum section 44 has a diameter of seven and one-half inches, the net cable travel for one revolution of crank 27 is about one and one-half inches. This figure is arrived at by subtracting the travel attributable to drum 44 from the travel attributable to drum 42. In the illustrated case, cable travel attributable to drum 42 is about twenty-five inches, whereas cable travel attributable to drum 44 is about twenty-three and one-half inches.

Use of the multi-diameter winding drum is advantageous in that a very small (slow) cable motion is achievable for each revolution of manual crank 27. The system has a relatively large force multiplication factor that enables the human operator to lift a relatively large load with a reasonable human effort.

The force multiplication feature could be obtained by other ways than the illustrated multi-diameter winding drum, e.g., a gear type speed reducer between crank 27 and the winding drum. However, the multi-diameter drum system is manufacturable at relatively low cost. Additionally, it takes up substantially no extra space (compared to a single diameter drum) or extra weight. The hoist shown in FIGS. 1 through 3 can be built as a relatively small light-weight unit. It is easily stored and transported to the cargo vehicle. Installation of the hoist on cargo bed 10 can be readily accomplished by turning down the single hold-down bolt 19.

WINDING ACTION

The winding action is best visualized by reference to FIGS. 4 and 5. If crank 27 is turned in a clockwise direction (FIG. 5), cable 26 winds onto drum section 42, as indicated by arrow E; simultaneously cable 26 winds off drum section 44, as indicated by arrow A.

Cable section 54 produces clockwise rotation of pulley 24a, as indicated by arrow B; cable section 48 produces counterclockwise rotation of pulley 24b, as indicated by arrow D. Sheave 40 is rotated in a clockwise direction. Due to the diameter differences between drum sections 42 and 44, sheave 40 is caused to move upwardly; load 16 moves upwardly with the sheave.

If crank 27 is turned in a counterclockwise direction (FIG. 5), the various cable sections move in the reverse direction. Sheave 40 moves in a downward direction.

HOIST OPERATION

FIG. 1 best illustrates the hoist operation. To transfer load 16 from position 16a to position 16b, crank 27 is initially turned in a clockwise direction. Load-suspension mechanism 32 (with the load attached) moves upwardly until latch element 29 has its opening 41 in registry with pin 35. At that point, latch element 29 is manually swung toward boom 20 to effect latching engagement with pin 35.

With suspension mechanism 32 temporarily attached to boom 20, crank 27 is turned in a counterclockwise direction. Cable section 48 winds off drum section 42, so that boom 20 swings around the axis of pivot pins 38 to the FIG. 1 dashed line position.

The desired boom motion is obtained because of the orientations of boom swing axis at 38, the pulley axis at 35 and the winding drum axis at 46. It will be seen that the distance between the winding drum axis and the pulley axis increases as boom 20 swings from the FIG. 1 full line (upright) position to the dashed line (prone) position. Numeral 56 indicates the magnitude of the increase. The dimensional increase denoted by numeral 56 is accomplished or permitted by extension movements of cable 26, i.e., by manual rotation of crank 27 in a counterclockwise direction.

When boom 20 reaches its prone position 20b the suspended load will be in position 16c. To lower the load to position 16b, it is necessary to disconnect latch element 29 from pin 35.

Thereafter, counterclockwise rotation of crank 27 will allow the load to lower to the desired position.

To transfer the load from position 16b to position 16a the above described sequence of operations is reversed. Suspension mechanism 32 is connected to bail 31, with boom 20 in its prone position. Crank 27 is rotated in a clockwise direction so that load 16 is lifted to position 16c. Latch element 29 is then attached to the exposed end of shaft 35, thereby locking the load and boom together.

Manual rotation of crank 27 in a clockwise direction swings boom 20 from the prone position to the upright position. Thereafter, latch element 29 may be disconnected from shaft 35. The load may be lowered to position 16a by manual rotation of crank 27 in the counterclockwise direction.

It will be noted that during the process of transferring load 16 between its lowered position 16b and its raised position 16a (or vice versa), latch element 29 is attached and detached to/from boom 20.

While the attachment/detachment operation is taking place, it is desirable to temporarily support load 16 by some means other than manual pressure on crank 27. A ratchet may be mounted on one of pins 46, as indicated by dashed lines 47 in FIG. 2; a manual detent (not shown) would be utilized with the ratchet to temporarily hold the winding drum against undesired rotation.

The described hoist is relatively cheap and easy to manufacture. Nevertheless, the hoist has several advantageous operational features. For example, the cable-drum arrangement provides a speed reducer effect from crank 27 to the cable; the very slow cable movement enables the soldier or technician to lift relatively heavy loads with small human effort.

The slowness (or fastness) of cable movement is related to the difference in diameters of drum sections 42 and 44. By making the difference in diameters relatively small it is possible to achieve a very slow cable movement, with correspondingly large lifting capacity. Diameter selection should take into account the diameter of the crank 27 rotational motion and the absolute diameters of the winding drum sections.

The described system is also believed advantageous in that loads of varying height can be readily accommodated. To elaborate, the spacing between load-suspension mechanism 32 and pulleys 24a, 24b permits relatively tall loads or relatively short loads to be attached/detached to or from the hoist.

Whatever the height of the load, latch element 29 effectively locks the load to boom 20 for lateral motion.

In general, the load-suspension mechanism 32 is locked to the boom during the time when the load is moving toward or away from the cargo bed (i.e., between positions 16a and 16c); load-suspension mechanism 32 is disconnected from the boom while the load is being raised or lowered.

Use of the load-suspension mechanism permits a relatively large multi-direction travel of the load, with a relatively small length boom. The load can readily clear the edge 13 of the cargo bed, even when the load is relatively tall and bulky.

In most cases, the hoist can be operated by one human technician (although the process would be quicker if there were two people). The hoist is visualized as a relatively small light weight piece of equipment capable of quick attachment to a vehicle, when required for cargo transfer purposes. The hoist would have special usefulness with military trucks or trailers designed to travel off-the-road in geographical areas where there is no commercial hoist equipment.

I wish it to be understood that I do not desire to be limited to the exact details of construction shown and described for obvious modifications will occur to a person skilled in the art, without departing from the spirit and scope of the appended claims.

What is claimed is:

1. A hoist mountable on the bed of a cargo vehicle for transferring a load between ground level and the bed: said hoist comprising a support frame (18) anchored to the bed in a location spaced from an edge (13) of the bed, whereby the bed area between the support frame and bed edge is adapted to receive a load; a winding drum (22) rotatably supported in the frame remote from the aforementioned edge of the bed; an elongated non-extensible boom (20) having an inner end and an outer end, means (38) swingably connecting the inner end of the boom to the support frame, whereby the boom can move between a generally upright position extending upwardly from the bed and a generally prone position projecting laterally beyond the aforementioned bed edge; stop means (15,17) carried by the frame for limiting the boom to motion between its upright and prone positions; pulley means (24a, 24b) at the outer end of the boom, said pulley means being mounted for rotation on a horizontal axis with a projecting axial portion; a load-suspension means (32) designed to operate in the space below the pulley means; cable means trained around the winding drum, over the pulley means, and thence down to the load-suspension means; and disengageable latch means (29) having a swingable ear structure with an opening therein carried by the load-suspension means for temporary attachment of the opening to the projecting portion on the outer end of the boom when the load-suspension means is in near-adjacency to the pulley means; the boom swing axis being closer to the aforementioned edge of the bed than the winding drum axis so that when the boom is moving from its upright position to its prone position the spacing between the winding drum axis and the pulley means axis increases; said boom being dimensioned so that when it is in its prone position it can be latched to the load-suspension means, whereby subsequent rotation of the winding drum in a first direction causes the boom to swing upwardly to its upright position for laterally transporting the suspended load to a position above the vehicle bed, after which the load-suspension means can be unlatched from the boom to permit the load to be lowered onto the bed by rotation of the winding drum in a second direction; the support frame constituting the sole support mechanism for the boom and winding drum.

* * * * *